Sept. 23, 1941.    L. A. ARMSTRONG    2,256,770
ELECTRICALLY HEATED ICE CREAM DIPPER
Filed Aug. 7, 1939
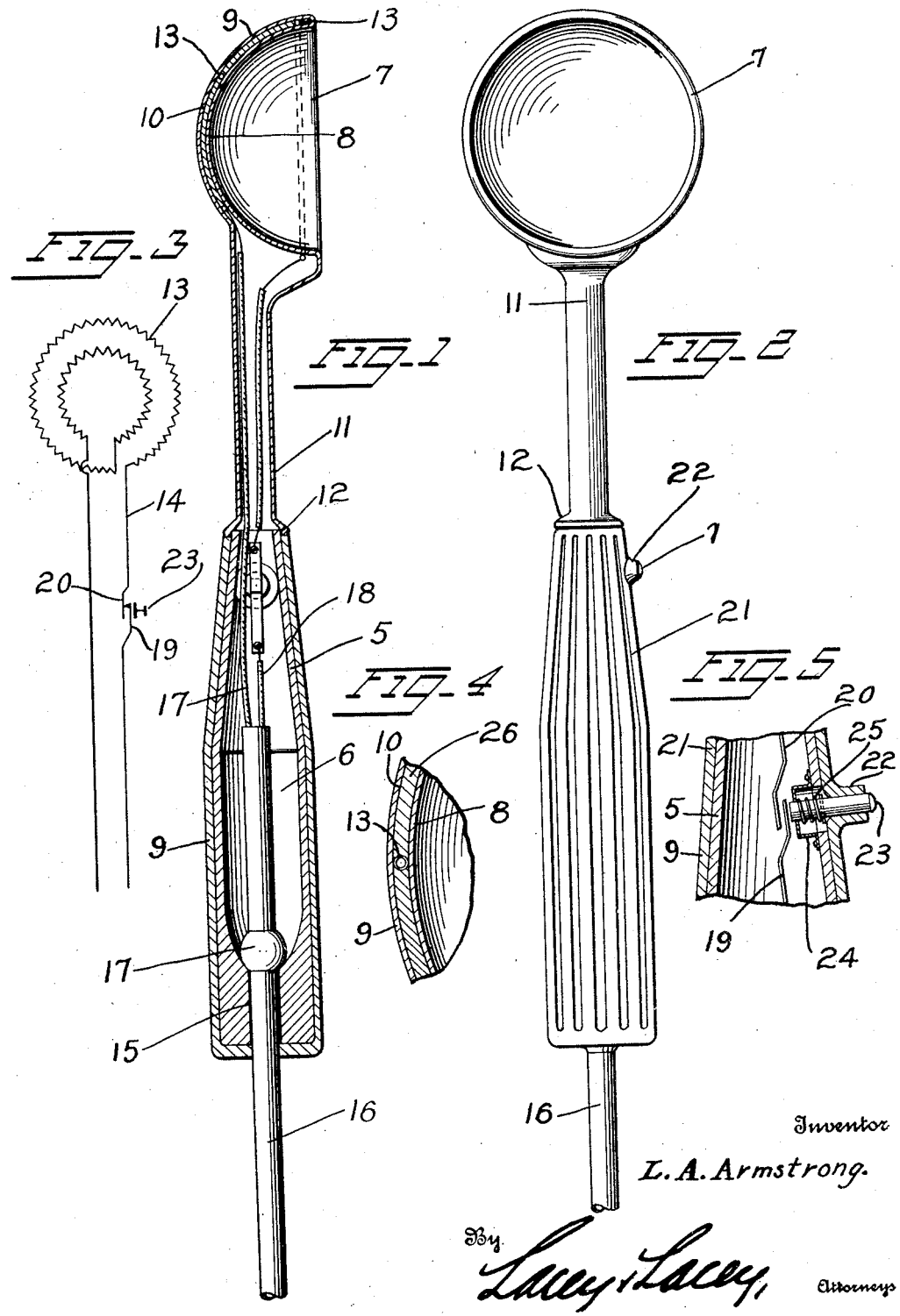
Inventor
L. A. Armstrong.
By Lacey & Lacey, Attorneys Patented Sept. 23, 1941

2,256,770

UNITED STATES PATENT OFFICE 2,256,770

ELECTRICALLY HEATED ICE CREAM DIPPER

L. A. Armstrong, Oklahoma City, Okla.

Application August 7, 1939, Serial No. 288,897

1 Claim. (Cl. 219—21)

This invention relates to scoops or dippers and more particularly to an electrically heated dipper especially designed for dispensing ice cream at soda fountains, in restaurants, cafes or wherever ice cream is served.

The object of the invention is to provide an ice cream dipper of simple and inexpensive construction having a heating element associated therewith for warming the walls of the dipper so that a person may readily scoop a cup of ice cream from a can or other container without the necessity of exerting downward pressure on the handle of the dipper and without liability of the ice cream sticking or otherwise adhering to the walls of the cup portion of said dipper.

A further object of the invention is to provide an ice cream dipper, the cup portion of which is provided with inner and outer walls defining an intermediate chamber for the reception of an electric heating element, there being a switch mounted on the handle of the dipper and operatively connected with said heating element for controlling the same.

A still further object of the invention is generally to improve this class of devices so as to increase their utility, durability and efficiency as well as to reduce the cost of manufacture.

In the accompanying drawing forming a part of this specification and in which similar numerals of reference indicate corresponding parts in all the figures of the drawing:

Figure 1 is a vertical sectional view of an ice cream dipper or scoop embodying the present invention, Figure 2 is a front elevation, Figure 3 is a diagrammatic view of the electric heating element detached, Figure 4 is an enlarged detail sectional view of the cup portion of the dipper, and Figure 5 is an enlarged vertical sectional view showing the construction of the handle supported switch.

The improved ice cream dipper or scoop forming the subject-matter of the present invention comprises a supporting handle 5 preferably formed of wood and having its central portion hollowed out to form a chamber 6 opening through the opposite ends of the handle, as shown. Mounted on the handle 5 is a cup or scoop 7 adapted to receive the ice cream to be dispensed, said cup being semi-spherical in shape and formed with inner and outer walls 8 and 9 defining an intermediate arcuate compartment 10. The cup 7 is preferably formed of aluminum and the walls of the scoop are extended downwardly to form a tubular member or shank 11 terminating in a lateral flange 12 which fits over the adjacent end of the handle 5, as shown.

Disposed within the compartment 10 is a heating element 13 preferably consisting of inner and outer resistance wires, the terminals 14 of which are covered with insulating material and extend longitudinally within the tubular member or shank 11. Extending through an opening 15 in the lower portion of the handle 5 is an electric conductor 16 having a spherical portion 17' mounted thereon which bears against the lower wall of the chamber 6 and serves to take the strain off the conductor 16. One of the wires 17 of the conductor 16 is connected with the adjacent terminal of the heating element while the other wire 18 of the conductor is operatively connected with a spring contact plate 19. A similar spring contact plate 20 is secured to the inner wall of the chamber 6 in spaced relation to the contact plate 19, and secured to said contact plate 20 is the adjacent end of the other terminal 14 of the heating element.

Surrounding the handle 5 is a moisture-proof corrugated rubber jacket 21, the upper end of which is tapered and bears against and is secured to the flange 12 of the tubular member 11 so that the handle and its associated parts are completely sealed from moisture and the like. The jacket 21 is provided with a laterally extending boss 22, and slidably mounted in said boss is a push button 23 for the purpose of actuating the contact plates 19 and 20 to close an electric circuit through the heating element. The inner end of the push button 23 extends through a suitable casing or housing 24 secured to the inner wall of the handle 5. Surrounding the push button 23 and interposed between the casing 24 and the boss 22 is a coiled spring 25 which holds the button in extended position so that the contact plates 19 and 20 are separated and no current will flow to the heating element. Seated within the compartment 10 of the cup and surrounding the electric heating element 13 is a strip of isinglass or other suitable insulating material 26 so as to prevent a short circuit through the cup.

It will here be noted that one of the resistance wires surrounds the cup near the forward edge thereof while the other resistance wire is arranged at the rear of the cup so that the entire surface of the cup will be heated when the switch is closed and thus permit the cup to enter the body of ice cream in a container with very little resistance and at the same time prevent ice cream from sticking or otherwise adhering to either the inner or outer walls of said cup.

In use, the operator presses inwardly on the push button 23 and then inserts the cup portion 7 of the dipper within a can or other vessel containing the ice cream. Inasmuch as the walls of the cup 7 are heated by the element 13, the cup will pass through the ice cream without any resistance and without danger of the ice cream sticking or otherwise adhering to either the interior or exterior walls of said cup. By the use of this device a material saving in ice cream is effected when dispensing the same at soda fountains or wherever ice cream is served.

It will, of course, be understood that the dippers may be made in different sizes and shapes and constructed of any suitable material without departing from the spirit of the invention.

Having thus described the invention, what is claimed as new is:

An ice cream dipper comprising a hollow handle having a concave bearing seat in one end thereof and provided with an opening intersecting said seat, an insulating jacket surrounding the handle, a double walled cup provided with a tubular member having one end thereof provided with a laterally extending flange fitting over the adjacent end of the handle and abutting against the insulating jacket, an electric heating element disposed between the walls of the cup, an electric conductor extending within the opening in the handle and operatively connected with the heating element, a strain eliminator carried by the conductor and having a spherical portion fitting within the concave bearing seat of the handle, and a switch including an operator mounted through a side wall portion of the handle for actuation by a finger of a hand grasping the handle, said switch being in the hollow handle and operatively associated with the conductor for controlling the flow of current to the heating element.

L. A. ARMSTRONG.